Patented June 20, 1939

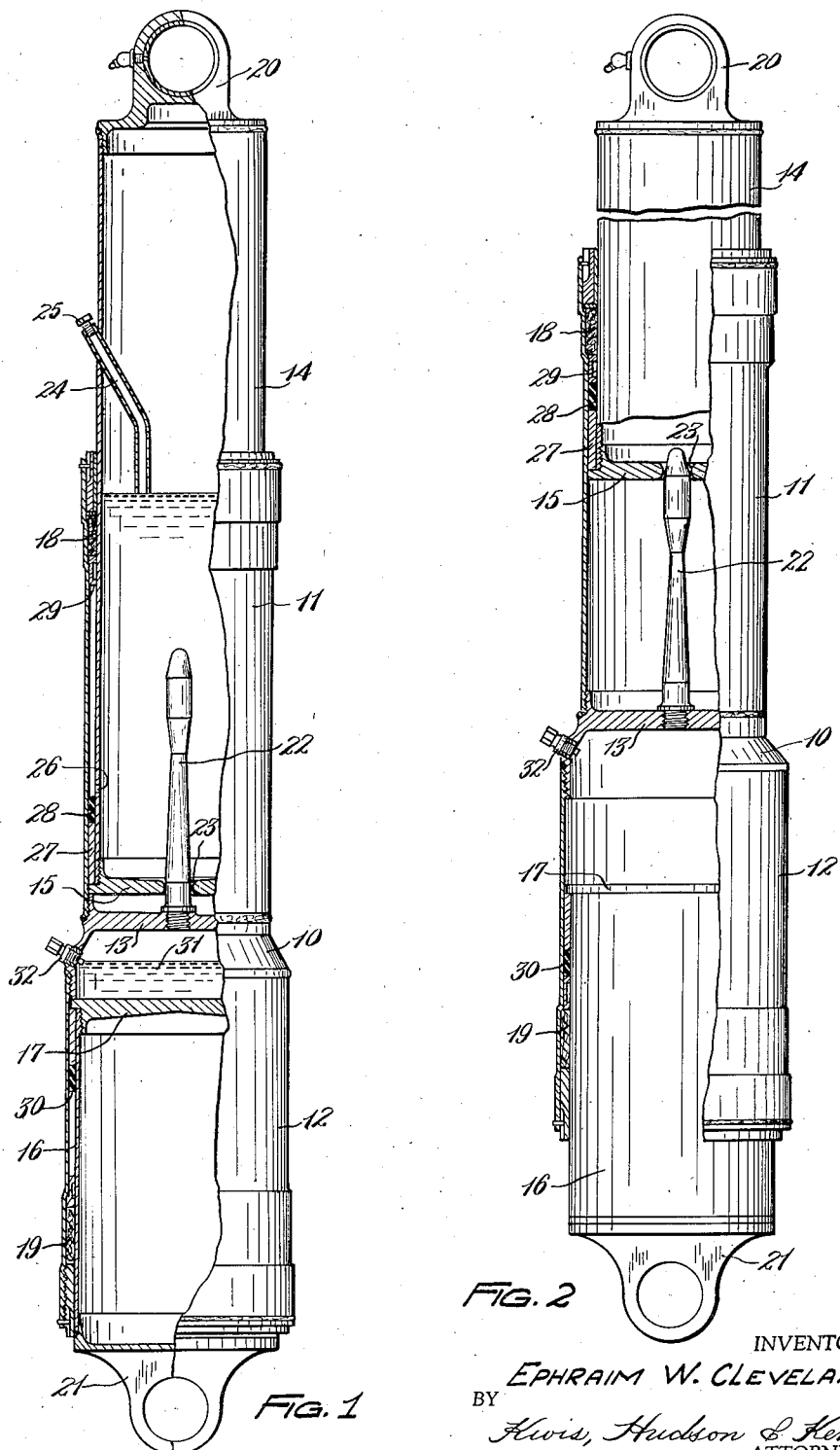

2,163,459

UNITED STATES PATENT OFFICE 2,163,459

SHOCK ABSORBER

Ephraim W. Cleveland, Berea, Ohio, assignor to The Cleveland Pneumatic Tool Company, Cleveland, Ohio, a corporation of Ohio Application December 10, 1936, Serial No. 115,167

5 Claims. (Cl. 267—64)

This invention relates to improvements in shock absorbers, and has to do particularly with shock absorbers for aircraft. Such shock absorbers have two different duties to perform, that is to say they must check or cushion the shock of impact when the airplane strikes the ground and imposes its weight upon the running gear, and second they must absorb the shocks encountered as the airplane taxies over the ground.

For shocks of the first class it is highly desirable to provide a stroke of considerable length, for by that means the heavy impact of landing may be distributed over a greater period of time and be less apparent to the occupants of the airplane and less likely to cause damage to the structural parts or mechanism thereof. Shock absorbers that are relatively long when in their expanded condition do not always work in well with the design of an airplane however, and this is particularly true when the running gear is to be retracted in flight.

One of the objects of the present invention is the provision of a shock absorber for airplanes which has a relatively long stroke, but which may be readily contracted while in the air to facilitate the retraction of the landing gear.

Another object is the provision of a shock absorber in which the pneumatic chamber is entirely separate from the hydraulic chamber, whereby the hydraulic chamber, in which the greater portion of the stroke is accommodated, may be contracted mechanically without opposition from the compressed air in the pneumatic chamber.

Other objects and features of novelty will appear as I proceed with the description of the accompanying drawing, in which Fig. 1 is an elevational view partly in section of a shock absorber embodying the invention, the parts being shown in their fully contracted positions, and Fig. 2 is a similar view with the telescoping parts expanded to the outer limits of their movements.

In the drawing there is illustrated an intermediate member 10 in the form of a cylindrical casing having a small diameter part 11 and a large diameter part 12. Preferably these two parts are formed of heavy gauge tubing secured at their inner ends to a forging or casting which embodies a partition 13 that is fluid-tight and divides the casing into upper and lower chambers.

Telescoping within the upper part 11 of the casing there is an upper cylindrical member 14 which carries a piston head 15 at its lower extremity. A lower cylindrical member 16 telescopes within the lower part 12 of the casing, and is closed at its upper end by a piston head 17. At the outer extremities of the upper and lower parts 11 and 12 of the casing there are annular packings 18 and 19 respectively of any suitable character, which engage the upper and lower cylindrical members 14 and 16, forming fluid-tight seals. The outer ends of cylindrical members 14 and 16 carry brackets 20 and 21 by means of which these members may be attached to the parts whose relative movements are to be cushioned, that is to say the bracket 20 would generally be attached to some part of the fuselage or wing structure of an airplane and the bracket 21 to some part of the running gear thereof. The intermediate member or casing 10, it will be observed, may move in a longitudinal direction relative to either or both of the members 14 and 16. It holds the members 14 and 16 in axial alignment, but it is not attached to either of them and may be said to float upon them.

A metering pin 22 of known form is threaded or otherwise rigidly mounted in the partition 13 to extend upwardly therefrom. Its joint with the partition must be fluid-tight if the tapped hole extends through the partition as illustrated herein. This pin extends through an aperture 23 in the piston head 15, which aperture constitutes a liquid metering port. The chamber above partition 13 is partially filled with liquid, as indicated in Fig. 1. In order to insure the filling of the chamber with the proper amount of liquid I mount a filler tube 24 in the cylindrical member 14, with a threaded plug 25 for closing the exposed end thereof. With the parts in their fully contracted condition, as illustrated in Fig. 1, liquid, such as oil, is poured through the tube 24. When the liquid reaches the level indicated it closes the lower end of tube 24, preventing the escape of air through the tube. The tube then becomes filled with liquid and no more can be received. One or more small openings 26 in the wall of the cylinder 14 admit liquid to the annular chamber surrounding the wall. The flow of liquid into and out of this annular chamber during the operation of the strut is primarily for lubricating purposes. The air remaining above the liquid level in the main chamber is of course at atmospheric pressure in this contracted condition of the chamber, and at other times it is rarefied more or less. It never gets above atmospheric pressure in the operation of the strut.

Surrounding the cylinder 14 just above the piston head 15 there is a reenforcing band 27 which also forms a bearing for the piston upon the inner wall of the casing. Just above this band there is a sleeve 28 of soft rubber which engages a metal ring 29 below the packing 18, and thus forms a resilient stop for the relative expansion of the members 11 and 14.

A similar rubber ring 30 on the cylindrical member 16 below the piston head 17 performs the same function for the pneumatic unit at the lower end of the shock absorber. For the purpose of lubricating the telescoping movements of the cylindrical member 16 and the lower part 12 of the casing, and to assist the seal effected by the packing 19, I place a small quantity of oil in the lower chamber above piston head 17, as indicated at 31. Thereafter I inflate this chamber through an air valve 32. This is done preferably while the weight of the airplane is resting upon the running gear, and the desired degree of inflation may be determined substantially by the height to which the lower extremity of the casing member 12 rises above the lower end of cylindrical member 16.

When an airplane equipped with shock absorbers of this kind takes off the compressed air in the lower chamber expands that chamber progressively as the running gear is relieved of the weight of the plane, this part of the shock absorber in the meantime functioning to absorb the shocks of taxiing. When the airplane is in the air the lower chamber is of course fully extended, and immediately thereafter the weight of the running gear, which is suspended upon the lower cylindrical members 16 upon the two sides of the airplane, and is communicated thereby to the intermediate members 10, tends to expand the upper chamber. This expanding action proceeds slowly because of the fact that a partial vacuum is created in the space below piston head 15 which may be broken only gradually by the metered flow of liquid downwardly through aperture 23.

Suitable mechanical means may be provided for operation by the pilot to lift the parts 10 and 16 of the shock absorbers and the running gear supported thereby, so as to contract the upper chambers of the shock absorbers to the condition illustrated in Fig. 1, after which by means of known mechanism the shock absorbers and running gear may be swung up into retracted position. The reverse of these operations is followed when a landing is to be made, the upper chambers of the shock absorbers being then expanded by gravity so that they are in the condition illustrated in Fig. 2 when the running gear first touches the ground. The first shocks are taken largely by the upper or hydraulic units of the shock absorbers, although if the impact should be very heavy the pneumatic units would yield also to some extent. After the weight of the airplane is assumed by the running gear, the pneumatic unit comes into play and the shocks of taxiing are borne thereby.

As previously stated, there is no pressure in the upper unit opposing the effort of the pilot to contract the shock absorbers. The stroke of the upper unit is much longer than that of the lower unit, so that the contraction of the upper unit preparatory to folding up the running gear is more important than would be the contraction of the lower unit.

Having thus described my invention, I claim:

1. In a shock absorber for aircraft, an elongated casing, a fluid-tight partition therein dividing the casing into two chambers, a hydraulic unit in one of said chambers operating at substantially atmospheric pressure, said unit embodying a metering pin carried by the partition, a pneumatic unit in the other of said chambers operating at super-atmospheric pressure, each of said units comprising a piston, and means for attaching said pistons to the parts whose relative movements are to be cushioned, whereby shocks of landing are taken primarily in the hydraulic unit and severe shocks are taken by conjoint action of both units.

2. In a shock absorber for aircraft, an elongated casing, a fluid-tight partition therein dividing the casing into two chambers, a hydraulic unit on one of said chambers, said unit containing an incompressible fluid and a compressible fluid under pressure no greater than atmospheric pressure, a pneumatic unit in the other of said chambers operating at super-atmospheric pressure, each of said units comprising a piston, and means for attaching said pistons to the parts whose relative movements are to be cushioned, whereby shocks of landing are taken primarily in the hydraulic unit and severe shocks are taken by conjoint action of both units.

3. In a shock absorber for aircraft, upper and lower cylindrical members adapted to be attached to the elements whose relative movements are to be cushioned, an intermediate cylindrical member telescoping with said upper and lower cylindrical members, said intermediate member comprising a fluid-tight partition dividing the shock absorber into upper and lower chambers, hydraulic metering means in the upper chamber operating at substantially atmospheric pressure for checking relative movement between said intermediate member and upper member, and pneumatic means in the lower chamber operating at super-atmospheric pressure for absorbing shocks between said intermediate member and said lower member, whereby shocks of landing are taken primarily in the hydraulic unit and severe shocks are taken by conjoint action of both units.

4. In a shock absorber for aircraft, two chambers, a fluid-tight partition between said chambers, one chamber being entirely on one side of the said partition and the other chamber entirely on the other side thereof, a hydraulic unit in one of said chambers operating at atmospheric pressure, a pneumatic unit in the other chamber operating at super-atmospheric pressure, each of said units comprising a piston, and means for attaching said pistons to the parts whose relative movements are to be cushioned, whereby shocks of landing are taken primarily in the hydraulic unit and severe shocks are taken by conjoint action of both units.

5. In a shock absorber for aircraft, an upright cylindrical casing, a fluid-tight partition therein dividing the casing into upper and lower chambers, a metering pin extending upwardly from said partition, an upper cylindrical member telescoping with said casing and comprising a piston head having an aperture surrounding said metering pin whereby liquid is metered from one side to the other of said piston head during relative movements of the casing and upper telescoping member, said upper chamber operating at substantially atmospheric pressure, a lower cylindrical member telescoping the said casing and comprising a piston head, compressible fluid under superatmospheric pressure between said last named piston head and said partition, and means for attaching said upper and lower cylindrical members to the parts whose relative movements are to be cushioned, whereby shocks of landing are taken primarily in the hydraulic unit and severe shocks are taken by conjoint action of both units.

EPHRAIM W. CLEVELAND.